(12) United States Patent
Sano et al.

(10) Patent No.: US 8,236,451 B2
(45) Date of Patent: Aug. 7, 2012

(54) NEGATIVE ELECTRODE FOR LITHIUM PRIMARY BATTERY AND LITHIUM PRIMARY BATTERY

(75) Inventors: Yoko Sano, Osaka (JP); Tsuyoshi Yanagimoto, Osaka (JP)

(73) Assignee: Panasonic Corporation, Osaka (JP)

( * ) Notice: Subject to any disclaimer, the term of this patent is extended or adjusted under 35 U.S.C. 154(b) by 468 days.

(21) Appl. No.: 12/426,018

(22) Filed: Apr. 17, 2009

(65) Prior Publication Data

US 2009/0263722 A1    Oct. 22, 2009

(30) Foreign Application Priority Data

Apr. 18, 2008 (JP) .................................. 2008-108891
Apr. 9, 2009 (JP) .................................. 2009-094600

(51) Int. Cl.
*H01M 4/06* (2006.01)

(52) U.S. Cl. .................................................. 429/231.95
(58) Field of Classification Search ........... 429/121–347
See application file for complete search history.

(56) References Cited

U.S. PATENT DOCUMENTS 5,503,946 A * 4/1996 Fauteux et al. ................ 429/50

FOREIGN PATENT DOCUMENTS

| JP | 11-135116 | 5/1999 |
| JP | 2005-216601 | 8/2005 |
| JP | 2006-236890 | 9/2006 |
| JP | 2006-339046 | 12/2006 |

OTHER PUBLICATIONS

Gotanda et al. JP 2006-236890, English Translation provided by JPO. Sep. 7, 2006.*
Aurbach, Doron. "Identification of Surface Films Formed on Lithium Surfaces in gamma-Butyrolactone Solutions." Journal of the Electrochemical Society 136.6 (1989): 1606-610.*

* cited by examiner

*Primary Examiner* — Basia Ridley
*Assistant Examiner* — James Lee
(74) *Attorney, Agent, or Firm* — McDermott Will & Emery LLP

(57) ABSTRACT

A lithium primary battery includes a positive electrode, a negative electrode, a separator, a positive electrode case, a negative electrode case, a gasket, and a non-aqueous electrolyte. The negative electrode includes: lithium or a lithium alloy; a lithium carboxylate layer formed on a surface of the lithium or lithium alloy; and a carbon layer formed on a surface of the lithium carboxylate layer. This configuration allows the lithium primary battery to have suppressed negative electrode polarization during discharge and improved large-current discharge characteristics in a low temperature environment and after high temperature storage.

3 Claims, 13 Drawing Sheets

NEGATIVE ELECTRODE FOR LITHIUM PRIMARY BATTERY AND LITHIUM PRIMARY BATTERY

FIELD OF THE INVENTION

The invention relates to negative electrodes for lithium primary batteries and lithium primary batteries. More particularly, the invention mainly relates to an improvement in the negative electrode for a lithium primary battery.

BACKGROUND OF THE INVENTION

Lithium primary batteries, which have high electromotive force and high energy density, have been widely used as the main power source or memory back-up power source for electronic devices, such as portable appliances and in-car electronic devices. Lithium primary batteries include: a positive electrode comprising a positive electrode active material that is, for example, a metal oxide such as manganese dioxide, or graphite fluoride; a separator; a negative electrode comprising lithium or a lithium alloy; and a non-aqueous electrolyte. Among lithium primary batteries, those using graphite fluoride have long shelf life and good stability in a high-temperature environment and can be used in a wide temperature range, compared with those using a metal oxide such as manganese dioxide.

With the recent trend toward smaller, lighter, and more sophisticated electronic devices, lithium primary batteries are also required to provide higher battery performance. In particular, when they are used as the main power source or memory back-up power source for in-car electronic devices, they are required to provide sufficient discharge characteristics in a wide temperature range from low temperature of approximately −40° C. to high temperature of approximately 125° C. Lithium primary batteries exhibit discharge characteristics of a voltage drop in the initial discharge stage followed by a gradual voltage rise. The greater the voltage drop in the initial discharge stage, the lower the battery performance. Such discharge characteristics are evident when a discharge is performed at a large current. Also, in some applications, primary batteries such as lithium primary batteries are repeatedly partially discharged (i.e., a part of the battery capacity is repeatedly discharged) until they are fully discharged.

To heighten the performance of lithium primary batteries, various attempts have been made, but improvements in the negative electrode are insufficient. Since lithium is highly reactive, a coating film containing various components is formed on the surface of a negative electrode comprising lithium or a lithium alloy during negative electrode production, battery fabrication and the like. Such coating film may determine the discharge characteristics of the battery. For example, when the battery is discharged in a low temperature environment, the coating film acts as a resistance component, thereby increasing the polarization (overvoltage) of the negative electrode in the initial discharge stage. As a result, the voltage in the initial discharge stage may significantly drop.

Also, in the case of using a positive electrode comprising graphite fluoride or a non-aqueous electrolyte including a fluorine-containing solute, fluorine derived therefrom reacts with lithium in the negative electrode surface to form a coating film of lithium fluoride on the negative electrode surface. Since lithium fluoride is an insulator, the coating film may significantly increase the negative electrode polarization during discharge. In particular, in a low temperature environment of 0° C. or less, the negative electrode polarization significantly increases in the initial stage of a large-current discharge, so that the voltage drop in the initial discharge stage becomes evident. To suppress the voltage drop in the initial discharge stage, it is necessary to reduce the negative electrode polarization caused by the coating film formed on the negative electrode surface, and the like.

As described above, since the coating film formed on the lithium-containing negative electrode surface has a large impact on battery performance, various proposals have been made.

For example, when lithium is present on the surface of a negative electrode, the lithium is oxidized, so that an oxide coating film of lithium oxide or lithium hydroxide is formed on the surface. The oxide coating film increases the internal impedance of the battery, lowers the discharge performance of the battery, and increases the variation in battery performance. Noting this, Japanese Laid-Open Patent Publication No. 2005-216601 (hereinafter "Patent Document 1") has made a proposal. Patent Document 1 relates to a negative electrode including a negative electrode current collector and a negative electrode active material layer formed on the surface of the negative electrode current collector, wherein a coating film containing lithium carbonate (hereinafter "lithium carbonate coating film") is formed on the surface of the negative electrode active material layer.

The technique of Patent Document 1 is characterized in that when a negative electrode having lithium on the surface is used in a lithium ion secondary battery, a lithium carbonate coating film is formed on the surface of the negative electrode. The negative electrode used therein includes a negative electrode active material layer and a negative electrode current collector, wherein lithium is absorbed in the negative electrode active material layer. That is, Patent Document 1 intends to suppress the formation of an oxide coating film on the negative electrode surface by forming a lithium carbonate coating film on the negative electrode surface. In Patent Document 1, the lithium carbonate coating film is formed by causing the negative electrode active material layer to absorb lithium and bringing it into contact with carbon dioxide.

The technique of Patent Document 1 is effective when using a positive electrode comprising a metal oxide. However, when using a non-aqueous electrolyte including a fluorine-containing solute or a positive electrode comprising graphite fluoride, even if the lithium carbonate coating film is formed on the surface of the negative electrode active material layer, lithium fluoride, which is an insulator, is inevitably formed. As mentioned above, lithium fluoride significantly increases the negative electrode polarization and hence voltage drop in the initial discharge stage. As such, the lithium carbonate coating film is unable to prevent the formation of lithium fluoride.

Also, Japanese Laid-Open Patent Publication No. 2006-236890 (hereinafter "Patent Document 2") has made a proposal noting that the lithium carbonate coating film formed on the negative electrode surface is destroyed by battery partial discharge, so that a coating film different from the lithium carbonate coating film is formed on the negative electrode surface, thereby promoting the occurrence of a voltage drop. Patent Document 2 relates to a lithium primary battery including a positive electrode containing carbon fluoride, a negative electrode containing lithium, and a non-aqueous electrolyte. The battery of Patent Document 2 is characterized by the negative electrode and the non-aqueous electrolyte. The negative electrode has a lithium carbonate coating film with a thickness of 10 nm or more on the surface. The non-aqueous electrolyte contains 1,2-dimethoxyethane as the non-aqueous solvent, and the moisture content is 100 to 200 ppm.

In Patent Document 2, the use of the specific non-aqueous electrolyte stabilizes the impedance of the battery during storage after partial discharge, and suppresses the destruction of the lithium carbonate coating film due to partial discharge of the battery. However, moisture contained in the non-aqueous electrolyte reacts with the non-aqueous electrolyte, and the reaction products adhere to the negative electrode surface, thereby increasing the negative electrode polarization during partial discharge. Therefore, although the lithium primary battery of Patent Document 2 has high performance and good practicability, it needs to be improved in terms of further reducing the voltage drop during partial discharge.

Further, Japanese Laid-Open Patent Publication No. 2006-339046 (hereinafter "Patent Document 3") has made a proposal noting that lithium in the negative electrode surface reacts with components contained in the non-aqueous electrolyte to form an electrically inactive lithium compound on the negative electrode surface, which increases the negative electrode polarization and makes the voltage drop during discharge significant. Patent Document 3 relates to a lithium primary battery including a positive electrode, a negative electrode comprising lithium or a lithium alloy, a separator, and a non-aqueous electrolyte, wherein a carbon black layer is formed on the negative electrode surface. The carbon black layer formed on the negative electrode surface suppresses the reaction between the lithium and the non-aqueous electrolyte. It therefore suppresses an increase of a lithium compound which is an electrically inactive resistor on the negative electrode surface. As a result, it is possible to obtain a very high performance lithium primary battery that exhibits little voltage drop in the initial stage of a large-current discharge in a low temperature environment and after high temperature storage.

When the carbon black layer formed on the negative electrode surface comes into contact with the electrolyte, the potential of the carbon black becomes almost equivalent to that of the lithium or lithium alloy. Thus, a reaction of lithium ion insertion into the carbon black particles and a reaction of electrolyte decomposition proceed, so that decomposition products are deposited on the negative electrode surface in a short period of time. The decomposition products form a coating film that protects the negative electrode surface, thereby forming a stable negative electrode/electrolyte interface, compared with when carbon black is not used. Patent Document 3 states that when such interface is formed, negative electrode polarization in a low temperature environment and an increase in battery internal resistance due to high temperature storage are suppressed.

However, since a coating film containing various components is formed on the lithium surface, the reaction of lithium ion insertion into the carbon black particles and the electrolyte decomposition reaction proceed unevenly. That is, the electrolyte decomposition reaction may not proceed sufficiently. Hence, compared with the case of not using carbon black, negative electrode polarization in a low temperature environment and an increase in battery internal resistance due to high temperature storage are suppressed, but the effect of such suppression may be insufficient.

BRIEF SUMMARY OF THE INVENTION

It is therefore an object of the invention to provide a lithium primary battery exhibiting good large-current discharge characteristics in a low temperature environment and after high temperature storage.

In order to solve the problems as described above, the present inventors have diligently conducted research and found a laminated structure of a lithium-containing negative electrode surface, a lithium carboxylate layer, and a carbon layer. According to this structure, since a lithium carboxylate layer containing a carbonyl group is formed on the surface of lithium or a lithium alloy, the formation of a coating film containing various components such as lithium oxide or lithium hydroxide is suppressed. Further, lithium is evenly inserted into the carbon particles of the carbon layer on the negative electrode surface. Thus, as the electrolyte decomposition reaction proceeds on the carbon layer surface, the decomposition products are evenly deposited on the negative electrode surface, thereby forming a good negative electrode/electrolyte interface.

Further, since the carbon layer suppresses the reaction between the lithium carbonate layer and fluorine derived from the non-aqueous electrolyte or the positive electrode, the lithium carboxylate layer is stable, and the formation of LiF is suppressed. Furthermore, since the carbon layer suppresses the reaction between the negative electrode lithium and fluorine derived from the non-aqueous electrolyte or the positive electrode, the formation of LiF is suppressed. Also, even if LiF is formed, the LiF is formed on the carbon layer surface, not on the negative electrode surface, and hence, an increase in polarization of the negative electrode surface is suppressed. Therefore, the lithium primary battery of the invention exhibits good large-current discharge characteristics in a low temperature environment of −40° C., and also has good high-temperature storage characteristics. In particular, even during high temperature storage of 100° C. or more, an increase in battery impedance is significantly suppressed, and the voltage drop in the initial discharge stage is small.

That is, the invention is directed to a negative electrode for a lithium primary battery, including: lithium or a lithium alloy; a lithium carboxylate layer formed on a surface of the lithium or lithium alloy; and a carbon layer formed on a surface of the lithium carboxylate layer.

The lithium carboxylate layer is preferably formed by treating the lithium or lithium alloy with a five-membered heterocyclic compound containing one or two oxygen atoms as heteroatoms and a carbonyl group in a molecule.

The five-membered heterocyclic compound is preferably at least one selected from the group consisting of propylene carbonate, ethylene carbonate, vinylene carbonate, and γ-butyrolactone.

The lithium carboxylate layer preferably has a thickness of 10 to 30 nm.

The carbon layer preferably includes at least one selected from carbon black and graphite.

The invention also relates to a lithium primary battery including: a positive electrode including graphite fluoride or manganese dioxide; the negative electrode for a lithium primary battery of the invention; and a non-aqueous electrolyte.

In the lithium primary battery of the invention, the non-aqueous electrolyte preferably contains lithium tetrafluoroborate as a solute and γ-butyrolactone as a solvent.

The lithium primary battery of the invention using the negative electrode for a lithium primary battery of the invention exhibits good large-current discharge characteristics in a low temperature environment of −40° C. The lithium primary battery of the invention also has good large-current discharge characteristics after high temperature storage. In particular, even after storage at high temperatures of 125° C., an increase in internal impedance is significantly suppressed, and the voltage drop in the initial discharge stage is small.

While the novel features of the invention are set forth particularly in the appended claims, the invention, both as to organization and content, will be better understood and appreciated, along with other objects and features thereof, from the following detailed description taken in conjunction with the drawings.

DETAILED DESCRIPTION OF THE INVENTION

Negative Electrode for Lithium Primary Battery

Figure 1:
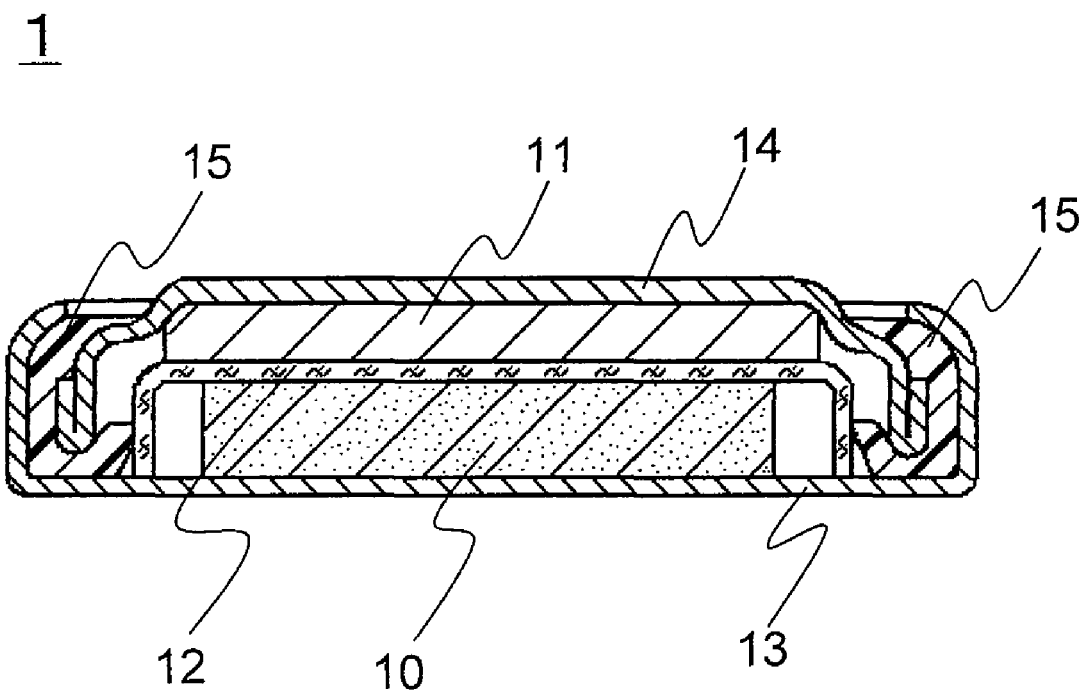
FIG. 1 is a longitudinal sectional view schematically showing the structure of a lithium ion primary battery in an embodiment of the invention.

The negative electrode for a lithium primary battery of the invention (hereinafter referred to as simply "negative electrode of the invention") includes lithium or a lithium alloy, and is characterized in that a lithium carboxylate layer and a carbon layer are formed in this order on at least the surface facing the positive electrode.

In the invention, the lithium carboxylate layer is formed on the surface of the negative electrode in which lithium is present, and the carbon layer is formed on the surface of the lithium carboxylate layer.

The lithium carboxylate layer of the invention is estimated to be a layer comprising a lithium carboxylate, from C1s and O1s spectra by X-ray photoelectron spectroscopy (XPS) relative to a change in the irradiation time of argon beam. The lithium carboxylate layer can suppress the formation of an oxide coating film containing lithium oxide or lithium hydroxide on the negative electrode surface. It should be noted that the lithium carboxylate layer of the invention is estimated to be a layer including lithium carbonate or a layer including a lithium carboxylate and lithium carbonate. A lithium carboxylate is, for example, a compound which contains a carboxyl group in the molecule, and one of the oxygen atoms of the carboxyl group is bound to lithium. Examples of the lithium carboxylates include lithium carbonate and lithium butyrate.

Also, the lithium of the negative electrode surface with the lithium carboxylate layer formed thereon has a good lithium reactivity. Thus, lithium is evenly inserted into the carbon particles of the carbon layer. As a result, the electrolyte decomposition reaction on the carbon layer surface proceeds evenly, so that the decomposition products are evenly deposited on the negative electrode surface. That is, a good negative electrode/electrolyte interface is evenly formed. Further, since the carbon layer suppresses the reaction between the lithium carboxylate layer and the fluorine derived from the non-aqueous electrolyte or the positive electrode, the lithium carboxylate layer is stable.

Also, since the carbon layer suppresses the reaction between the negative electrode lithium and the fluorine derived from the non-aqueous electrolyte or the positive electrode, the formation of LiF is suppressed. Also, even if LiF is formed, the LiF is formed on the carbon layer surface, not on the lithium or lithium alloy surface of the negative electrode. Hence, an increase in polarization of the lithium or lithium alloy surface is suppressed. As a result, the lithium primary battery of the invention exhibits good large-current discharge characteristics in a low temperature environment of −40° C. since the negative electrode polarization is suppressed. The lithium primary battery of the invention also has good high-temperature storage characteristics. In particular, even during high temperature storage at 100° C. or more, an increase in battery impedance is significantly suppressed, and the voltage drop in the initial discharge stage is small.

Also, the carbon layer prevents the destruction of the lithium carboxylate layer due to partial discharge. The carbon layer significantly suppresses an increase in negative electrode polarization, battery impedance and the like, caused by the products of the reaction between the lithium or lithium alloy and the components (in particular, solute) of the non-aqueous electrolyte. For example, in the case of using a fluorine-containing solute, the formation of LiF due to the reaction between the solute and lithium is suppressed. Also, in the case of using a positive electrode containing graphite fluoride, LiF is formed on the carbon layer surface, not on the negative electrode surface, so that an increase in polarization of the negative electrode (in particular, the negative electrode lithium surface) during discharge is suppressed.

Therefore, good large-current discharge characteristics can be obtained in a low temperature environment. For example, even in a low temperature environment, good pulse discharge characteristics can be obtained. Also, good high-temperature storage characteristics can be obtained.

Further, it has been found that the combined use of the lithium carboxylate layer and the carbon layer permits an expectedly significant improvement in the high-temperature storage characteristics of the battery. That is, it has been found that the combined use can significantly suppress an increase in battery impedance and battery swelling after high temperature storage. Since the increase in battery impedance is very small, the voltage drop during discharge becomes very small and stable discharge characteristics can be obtained. Specifically, even after a long-term storage at a temperature as high as 125° C., the degradation of discharge performance is very small. Also, since battery swelling is very small during high temperature storage, it is clear that even if the battery, for example, mounted in an electronic device, is exposed to high temperatures for a long period of time, the battery can perform its functions stably. In the invention, a high temperature storage test at 125° C. for 10 days was conducted.

Patent Document 3 states that the formation of the carbon layer can improve the high-temperature storage characteristics of the battery. However, this effect varies as the temperature rises, since the surface structure of the negative electrode containing lithium or lithium alloy is not controlled. Patent Document 3 is silent as to the high-temperature storage characteristics of the invention. Also, the high temperature storage test of Patent Document 3 was conducted at 60° C. for 45 days. Although this test was conducted more than 4 times longer than the high temperature storage test of the invention, there is a temperature difference of 65° C. Thus, in terms of the degree of harshness to the battery, the invention is significantly superior.

The negative electrode of the invention includes lithium or a lithium alloy. Compared with lithium, a lithium alloy is expected to provide improved physical properties or surface state. Any lithium alloy commonly used in this filed can be used if it contains lithium as the matrix component and contains one or two selected from metals that can be alloyed with lithium. Examples of metals that can be alloyed with lithium include aluminum, tin, magnesium, indium, calcium, and manganese. While the content of the metal that can be alloyed with lithium in the lithium alloy is not particularly limited, it is preferably 5% by weight or less of the whole amount of the lithium alloy. If it exceeds 5% by weight, such lithium alloy may have an increased melting point, an increased hardness, lower workability, and the like.

The lithium or lithium alloy is formed into a desired shape and thickness, depending on the shape, dimensions, performance, etc. of the finally obtained lithium primary battery, in the same manner as conventional negative electrodes for lithium primary batteries. For example, when the lithium primary battery is a coin battery, the lithium or lithium alloy is formed into a disc with a diameter of approximately 5 to 25 mm and a thickness of approximately 0.2 to 2.0 mm.

The surface of the negative electrode of the invention is provided with a lithium carboxylate layer. The lithium carboxylate layer can be formed, for example, by the following solvent treatment method and carbonic acid gas method.

According to the solvent treatment method, by bringing the lithium or lithium alloy into contact with a solvent, a lithium carboxylate layer is formed on the surface of the lithium or lithium alloy. The solvent can be a five-membered heterocyclic compound containing one or two oxygen atoms as heteroatoms and a carbonyl group in the molecule. Preferable examples of such five-membered heterocyclic compounds include propylene carbonate (PC), ethylene carbonate (EC), vinylene carbonate (VC), and γ-butyrolactone (γ-BL). Among them, γ-butyrolactone is particularly preferable.

Upon contact with the lithium, the five-membered heterocyclic compound readily reacts with the lithium to form a lithium carboxylate. More specifically, for example, the lithium or lithium alloy can be pressed with a tool to which the five-membered heterocyclic compound is attached. As a result, an active lithium surface is exposed and, at the same time, the lithium contacts the five-membered heterocyclic compound to form a lithium carboxylate layer. In particular, when PC is attached, a lithium carboxylate layer containing a relatively large amount of lithium carbonate is formed. Also, when γ-BL is attached, a lithium carboxylate layer containing a large amount of lithium butyrate is formed.

Also, according to the carbonic acid gas method, by bringing the lithium or lithium alloy into contact with a gas mixture of carbonic acid gas and an inert gas, a lithium carboxylate layer is formed on the surface of the lithium or lithium alloy. More specifically, for example, in a gas mixture of carbonic acid gas and an inert gas, the lithium or lithium alloy is pressed or cut to expose an active lithium surface. As a result, upon the exposure, the active lithium surface readily reacts with the carbonic acid gas to form lithium carbonate, so that a lithium carboxylate layer is formed. According to the carbonic acid gas method, a lithium carboxylate layer containing a lithium carbonate as a main component is formed. As the inert gas, for example, argon gas can be used.

Among these methods, the solvent treatment method is particularly preferable, since it can be performed in an atmosphere usually employed to fabricate a battery (e.g., dry air or an inert gas such as argon) and can be easily controlled in mass production.

The thickness of the lithium carboxylate layer is preferably 10 to 30 nm, for example, in terms of preventing the formation of an oxide coating film. If the thickness of the lithium carboxylate layer is less than 10 nm, the formation of an oxide coating film may not be sufficiently suppressed. On the other hand, it is difficult to form a lithium carboxylate layer with a thickness of greater than 30 nm. In the solvent treatment method, the thickness of the lithium carboxylate layer can be controlled by suitably selecting the pressure applied to the lithium or lithium alloy surface by the tool, the amount of the solvent attached to the tool, the pressing time, etc. In the carbonic acid gas method, the thickness of the lithium carboxylate layer can be controlled by adjusting the content of the carbonic acid gas in the gas mixture, the time for which the gas mixture is contacted, etc. The thickness of the lithium carboxylate layer can be measured and determined by X-ray photoelectron spectroscopy (XPS).

A carbon layer is formed on the surface of the lithium carboxylate layer. The carbon layer is a layer containing a powder of carbonaceous material (hereinafter "carbonaceous powder"). Carbon black or graphite is used as the carbonaceous material. Carbon black has good conductivity, and also has a small primary particle size. It can thus be porous enough to retain non-aqueous electrolyte and form an even carbon layer. Graphite also has good conductivity. While the particle size of the carbonaceous powder is not particularly limited, it is preferably 1 to 10 μm. The use of a carbonaceous material with a lower conductivity than carbon black and graphite for forming a carbon layer is not preferable, since it increases the negative electrode polarization during discharge.

Examples of carbon blacks include acetylene black, ketjen black, contact black, furnace black, and lamp black. These carbon blacks can be used singly or in combination of two or more of them. Examples of graphites include artificial graphites and natural graphites. Examples of artificial graphites include high purity graphite and highly crystalline graphite. These graphites can be used singly or in combination of two or more of them.

It is also possible to use one or more carbon blacks and one or more graphites in combination. Various commercially available carbon blacks and graphites can be used, and examples include DENKA BLACK (trade name, acetylene black, mean primary particle size: 35 nm, available from Denki Kagaku Kogyo K.K.), carbon ECP (trade name, ketjen black, available from Lion Corporation), and CARBOTRON PS(F) (trade name, artificial graphite, mean particle size: approximately 10 μm, available from Kureha Corporation).

The carbon layer can be formed by known methods. For example, Japanese Laid-Open Patent Publication No. Hei 11-135116 discloses a method for forming a carbon layer including a coating step and a pressing step. In the coating step, the surface of a lithium carboxylate layer is coated with a carbonaceous powder. This step is performed by bringing a coating roller to which a carbonaceous powder is attached and a voltage is applied into contact with the lithium carboxylate layer. In the pressing step, the lithium carboxylate layer coated with the carbonaceous powder is pressed. This step is performed by passing the lithium or lithium alloy with the carbonaceous-powder-coated lithium carboxylate layer through the nip of a pair of rollers pressed against each other. Pressing may be done while applying ultrasonic vibrations. In this way, the carbon layer is formed.

Also, Japanese Laid-Open Patent Publication No. 2006-339046 describes, for example, a method using a pressing tool, a method using a roller press, and a method using a solvent. The method using a pressing tool is performed by attaching a carbonaceous powder to an end face of a pressing tool, bringing the end face into contact with the surface of a lithium carboxylate layer, and pressing it. The method using a solvent is performed by applying or transferring a dispersion of a carbonaceous powder in a low boiling-point solvent to the surface of a lithium carboxylate layer, and pressing it with a hydraulic press or the like. In these methods, ultrasonic vibrations may be applied during the pressing. In this way, the carbon layer is formed.

While the thickness of the carbon layer is not particularly limited, it is preferably 0.5 to 5.0 μm. Alternatively, instead of controlling the thickness of the carbon layer, it is also possible to control the weight of the carbonaceous powder carried per unit area of the surface of the lithium carboxylate layer. For example, 0.1 to 1.0 mg of a carbonaceous powder is preferably carried per square centimeter of the surface of the lithium carboxylate layer, to form the carbon layer.

[Lithium Primary Battery]

The lithium primary battery of the invention includes a positive electrode, the above-described negative electrode of the invention, a separator, and a non-aqueous electrolyte. That is, the lithium primary battery of the invention may have the same configuration as conventional lithium primary batteries except for the negative electrode.

FIG. 1 is a longitudinal sectional view (cross-sectional view in the thickness direction) schematically showing the structure of a lithium primary battery 1 in one embodiment of the invention. The lithium primary battery 1 is a coin-shaped lithium primary battery including a positive electrode 10, a negative electrode 11, a separator 12, a positive electrode case 13, a negative electrode case 14, a gasket 15, and a non-aqueous electrolyte (not shown). The positive electrode 10, the separator 12, and the negative electrode 11 are laminated in this order to form an electrode assembly.

The positive electrode 10 includes, for example, a positive electrode active material, a conductive agent, and a binder, and is disposed so as to face the negative electrode 11 with the separator 12 therebetween.

The positive electrode active material can be one commonly used in the field of lithium primary batteries. Among them, for example, graphite fluoride and metal oxides such as manganese dioxide are preferable. Graphite fluoride is superior in terms of long-term reliability, safety, high temperature stability, and the like. Preferable graphite fluoride is represented by the chemical formula $(CF_x)_n$ wherein $0.9 \leq x \leq 1.1$. Graphite fluoride is prepared by fluorinating petroleum coke, artificial graphite or the like. According to this method, a carbonaceous material (C), such as petroleum coke, artificial graphite, and the like is reacted with fluorine (F) in a molar ratio of 1:x to form a substance comprising a large number (n) of C—F bonds in the 1:x ratio. This substance is called graphite fluoride.

When graphite fluoride is used in combination with a negative electrode that does not have a lithium carboxylate layer and a carbon layer, the fluorine liberated from the graphite fluoride tends to form a LiF layer, which is an electrical insulator, on the negative electrode surface. However, when graphite fluoride is used in combination with the negative electrode of the invention, a LiF layer in an amount affecting battery performance is not formed. Therefore, graphite fluoride, which significantly contributes to enhancing battery performance, can be used without limitation. Examples of metal oxides include manganese dioxide and copper oxides. These positive electrode active materials can be used singly or in combination of two or more of them.

The conductive agent can be an electronic conductor which does not cause a chemical change in the potential range when the positive electrode active material used is charged and discharged. Examples include graphites, carbon blacks, carbon fibers, metal fibers, and organic conductive materials. These conductive agents can be used singly or in combination of two or more of them. While the amount of the conductive agent used is not particularly limited, it is, for example, 5 to 30 parts by weight per 100 parts by weight of the positive electrode active material.

The binder can be a binder which does not cause a chemical change in the potential range when the positive electrode active material used is charged and discharged. Examples include fluorine resin such as polyvinylidene fluoride and the like, styrene-butadiene rubber, fluorine rubber, and polyacrylic acid. These binders can be used singly or in combination of two or more of them. While the amount of the binder used is not particularly limited, it is, for example, 3 to 15 parts by weight per 100 parts by weight of the positive electrode active material.

The negative electrode 11 is the negative electrode of the invention. A lithium carboxylate layer and a carbon layer are formed on the surface of the negative electrode 11 facing the positive electrode 10 with the separator 12 therebetween.

The separator 12 can be made of a material that is resistant to the environment inside the lithium primary battery 1, and examples include synthetic resin non-woven fabric and synthetic resin porous films. A porous film is also referred to as a microporous film. Examples of synthetic resins used to make non-woven fabric include polypropylene (PP), polyphenylene sulfide (PPS), and polybutylene terephthalate (PBT). Among them, PPS and PBT are preferable since they have good resistance to high temperature and solvent as well as good electrolyte retention. Also, examples of synthetic resins used to make porous films include polyethylene (PE) and polypropylene (PP).

The positive electrode case 13 serves as the positive electrode current collector and the positive electrode terminal. The negative electrode case 14 serves as the negative electrode current collector and the negative electrode terminal. The positive electrode case 13 and the negative electrode case 14 can be made of those commonly used in the field of lithium primary batteries. They are made of, for example, stainless steel.

The gasket 15 mainly insulates the positive electrode case 13 and the negative electrode case 14 from each other. The gasket 15 can be made of, for example, a synthetic resin such as polypropylene (PP), polyphenylene sulfide (PPS), or polyether ether ketone (PEEK). In particular, PPS is preferable since it has good resistance to high temperature and solvent as well as good processability.

The non-aqueous electrolyte contains a solute and a non-aqueous solvent.

The solute is a supporting salt dissolved in the non-aqueous solvent. The solute can be one commonly used in the field of lithium primary batteries, and examples include lithium hexafluorophosphate ($LiPF_6$), lithium tetrafluoroborate (LiBF$_4$), lithium trifluoromethylsulfonate (LiCF$_3$SO$_3$), lithium bis(trifluoromethylsulfonyl)imide (LiN(CF$_3$SO$_2$)$_2$), lithium bis(pentafluoroethylsulfonyl)imide (LiN(C$_2$F$_5$SO$_2$)$_2$), lithium (trifluoromethylsulfonyl)(nonafluorobutylsulfonyl)imide (LiN(CF$_3$SO$_2$)(C$_4$F$_9$SO$_2$)), lithium tris(trifluoromethylsulfonyl)methide (LiC(CF$_3$SO$_2$)$_3$), lithium perchlorate (LiClO$_4$) and the like. These solutes can be used singly or in combination of two or more of them.

While the solute concentration is not particularly limited, it is preferably 0.7 to 1.5 mol/L. If the solute concentration is less than 0.7 mol/L, for example, discharge characteristics at room temperature and long-term storage characteristics may degrade. On the other hand, if the solute concentration exceeds 1.5 mol/L, for example, the increase in the viscosity of the non-aqueous electrolyte and the decrease in ionic conductivity in a low temperature environment of approximately −40° C. may become evident.

The non-aqueous solvent can be one commonly used in the field of lithium primary batteries, and examples include γ-butyrolactone (γ-BL), γ-valerolactone (γ-VL), propylene carbonate (PC), ethylene carbonate (EC), butylene carbonate, vinylene carbonate, 1,2-dimethoxyethane (DME), 1,2-diethoxyethane (DEE), dimethyl carbonate (DMC), diethyl carbonate (DEC), ethyl methyl carbonate (EMC), N,N-dimethylformamide, tetrahydrofuran, 2-methyltetrahydrofuran, dimethyl sulfoxide, formamide, acetamide, diethylformamide, acetonitrile, propionitrile, nitromethane, ethyl monoglyme, trimethoxymethane, dioxolane, dioxolane derivatives, sulfolane, methylsulfolane, propylene carbonate derivatives, and tetrahydrofuran derivatives. These non-aqueous solvents can be used singly or in combination of two or more of them.

Among them, γ-butyrolactone is preferable since it is stable in a width temperature range and capable of easily dissolving the solute. Also, when γ-butyrolactone is used as the non-aqueous solvent, it is preferable to use LiBF$_4$ as the solute. The combined use of γ-butyrolactone and LiBF$_4$ significantly improves the high-temperature storage characteristics of the lithium primary battery 1. More specifically, even if the lithium primary battery 1 including a non-aqueous electrolyte which contains γ-butyrolactone and LiBF$_4$ is stored in a high-temperature environment of 85 to 125° C., for example, for 15 days, the battery hardly swells. Contrary to this, the use of non-aqueous electrolytes including other solutes may cause swelling that is noticeable by visual inspection.

It should be noted that the surface of the lithium or lithium alloy negative electrode 11 already has the lithium carboxylate layer and the carbon layer, and that an active surface of the lithium metal is not exposed. Also, in the lithium primary battery 1, since a coating film containing various components is formed on the lithium metal during negative electrode production, battery fabrication and the like, an active surface of the lithium metal and the electrolyte do not usually contact. Therefore, even if γ-butyrolactone is used as the non-aqueous solvent of the electrolyte, a reaction between the lithium metal and γ-butyrolactone hardly occurs.

The lithium primary battery 1 can be produced in the same manner as conventional lithium primary batteries except for the use of the negative electrode 11, which is the negative electrode of the invention.

For example, the positive electrode 10 is placed in the positive electrode case 13 so that it contacts the inner face of the positive electrode case 13, and the separator 12 is mounted thereon. Further, a non-aqueous electrolyte is injected therein to impregnate the positive electrode 10 and the separator 12 with the non-aqueous electrolyte.

Meanwhile, a molded lithium or lithium alloy as the negative electrode 11 is pressed to the flat inner face of the negative electrode case 14. A lithium carbonate layer and a carbon layer, not shown, are formed on the face of the negative electrode 11 facing the positive electrode 10. Subsequently, with the gasket 15 fitted to the circumference of the negative electrode case 14, the positive electrode case 13 and the negative electrode case 14 are combined together. Further, the opening of the positive electrode case 13 is crimped inward for sealing, to obtain the lithium primary battery 1. If necessary, the surface of the lithium primary battery 1 may be fitted with an outer jacket made of, for example, a resin film.

The lithium primary battery of the invention, which have good low-temperature, large-current discharge characteristics, can be advantageously used as the power source for electronic devices such as portable appliances and information devices, the main power source for in-car electronic devices, or the memory back-up power source.

EXAMPLES

The invention is hereinafter described more specifically by way of Examples and Comparative Examples.

Example 1

A coin-type lithium primary battery 1 of the invention as shown in FIG. 1 was produced in the following procedure.
(1) Production of Positive Electrode 10

Petroleum coke was fluorinated to prepare graphite fluoride ((CF$_{1.0}$)$_n$) as a positive electrode active material. The graphite fluoride, acetylene black (conductive agent), and styrene-butadiene rubber (SBR, binder) were mixed in a weight ratio of 100:15:6. This mixture was mixed with water and isopropyl alcohol and sufficiently kneaded to prepare a positive electrode mixture. This positive electrode mixture was dried at 70° C. and molded under pressure using a predetermined mold and a hydraulic press, to obtain a pellet with a diameter of 16 mm and a thickness of 3 mm. This pellet was dried at 100° C. for 12 hours to obtain the positive electrode 10.
(2) Production of Negative Electrode 11

A lithium disc (thickness 2.6 mm and diameter 12.7 mm) was mounted on the inner face of a stainless steel negative electrode case 14. This lithium disc was pressed until the thickness of the lithium disc became 1.3 mm, using a lithium press tool to which 330 μl of γ-butyrolactone (γ-BL) was attached, so that the lithium disc was pressed to the negative electrode case 14. A 30-nm thick lithium carboxylate layer was formed on the lithium disc surface. The lithium carboxylate layer contained lithium butyrate and lithium carbonate.

Further, an acetylene black powder (trade name: DENKA BLACK, trade mark, mean primary particle size 35 nm, available from Denki Kagaku Kogyo K.K.) was placed on the surface of the lithium carboxylate layer at 0.7 mg/cm$^2$, and a pressure was applied by ultrasonic vibrations to form a carbon layer. In this way, the negative electrode 11 was produced. The production of the negative electrode 11 was performed in a dry air with a dew point of −50° C. or less.
(3) Battery Fabrication The positive electrode 10 was mounted on the inner bottom face of a stainless steel positive electrode case 13, and a separator 12 was further mounted on the positive electrode 10. Subsequently, a predetermined amount of a non-aqueous electrolyte was injected therein to impregnate the positive electrode 10 and the separator 12 with the non-aqueous electrolyte. A polybutylene terephthalate non-woven fabric was used as the separator 12. The non-aqueous electrolyte used was prepared by dissolving lithium tetrafluoroborate ($LiBF_4$) in γ-butyrolactone (γ-BL) at a concentration of 1 mol/L.

Next, the negative electrode case 14 to which the negative electrode 11 was pressed was fitted with the positive electrode case 10 so that the negative electrode 11 and the positive electrode 10 faced each other. The open edge of the positive electrode case 10 was crimped onto the circumference of the negative electrode case 14 with a gasket 15 therebetween, to seal the opening of the positive electrode case 10. In this way, a coin battery (outer diameter 24.5 mm, thickness 5.0 mm) was produced. The production of the battery was performed in a dry air with a dew point of −50° C. or less.

Example 2

A coin-type lithium primary battery 1 of the invention was produced in the same manner as in Example 1, except that a negative electrode 11 was produced as follows.
[Production of Negative Electrode 11]

In a glove box filled with a gas mixture of argon gas and $CO_2$ gas ($CO_2$ concentration: 3000 ppm), a lithium ingot was extruded to a thickness of 1.3 mm and a width of 20 mm, to obtain a lithium metal having a 10-nm thick lithium carboxylate layer on the surface. The lithium carboxylate layer contained lithium carbonate. This lithium metal was punched out to a disc of 18.0 mm in diameter, which was then pressed to the inner face of a stainless steel negative electrode case 14. In the same manner as in Example 1, an acetylene black powder (DENKA BLACK) was placed on the surface of the lithium carboxylate layer to form a carbon layer, so as to obtain the negative electrode 11.

Example 3

A coin-type lithium primary battery 1 of the invention was produced in the same manner as in Example 1, except for the use of a carbon black powder (trade name: carbon ECP, mean primary particle size 39.5 nm, available from Lion Corporation) instead of the acetylene black powder (DENKA BLACK).

Example 4

A coin-type lithium primary battery 1 of the invention was produced in the same manner as in Example 1, except for the use of an artificial graphite powder (trade name: CARBOTRON PSF, mean particle size 9 μm, available from Kureha Corporation) instead of the acetylene black powder (DENKA BLACK).

Example 5

A coin-type lithium primary battery 1 of the invention was produced in the same manner as in Example 1, except for the use of an artificial graphite powder (high purity graphite, mean particle size 3 μm, specific surface area 12.8 $m^2/g$) instead of the acetylene black powder (DENKA BLACK).

Example 6

A coin-type lithium primary battery 1 of the invention was produced in the same manner as in Example 1, except for the use of a non-aqueous electrolyte prepared by dissolving $LiN(SO_2CF_3)_2$ in γ-butyrolactone (γ-BL) at a concentration of 1 mol/L.

Example 7

A coin-type lithium primary battery 1 of the invention was produced in the same manner as in Example 1, except for the use of a non-aqueous electrolyte prepared by dissolving $LiPF_6$ in γ-butyrolactone (γ-BL) at a concentration of 1 mol/L.

Example 8

Manganese dioxide serving as a positive electrode active material, ketjen black serving as a conductive agent, and fluorine resin (polytetrafluoroethylene (FEP), trade name: neofuron, available from Daikin Industries, LTD) were used. The manganese dioxide, ketjen black and fluorine resin were mixed in a weight ratio of 100:3:6. This positive electrode mixture was dried at 70° C. and molded under pressure using a predetermined mold and a hydraulic press, to obtain a pellet with a diameter of 16 mm and a thickness of 3 mm. This pellet was dried at 200° C. for 12 hours to obtain the positive electrode 10.

The non-aqueous electrolyte was prepared by dissolving lithium perchlorate ($LiClO_4$) at a concentration of mol/L in a solvent mixture (PC-DME solvent) of propylene carbonate (PC) and 1,2-dimethoxyethane (DME) in a volume ratio of 1:1.

A coin-type lithium primary battery 1 of the invention was produced in the same manner as in Example 1, except for the use of the positive electrode 10 and the non-aqueous electrolyte, obtained above.

Comparative Example 1

A coin-type lithium primary battery was produced in the same manner as in Example 1, except for the use of a negative electrode prepared in the following manner instead of the negative electrode 11.
[Production of Negative Electrode]

In a glove box filled with a gas mixture of argon gas and $CO_2$ gas ($CO_2$ concentration: 1000 ppm), a lithium ingot was extruded to a thickness of 1.3 mm and a width of 20 mm, to obtain a lithium metal having a 5-nm thick lithium carboxylate layer on the surface. This lithium metal was punched out to a disc of 18.0 mm in diameter, which was then pressed to the inner face of a stainless steel negative electrode case to produce a negative electrode.

Comparative Example 2

A negative electrode was produced by punching out a 1.3 mm thick lithium metal to a disc of 18.0 mm in diameter, pressing the disc to the inner face of a stainless steel negative electrode case, and forming a carbon layer on the surface of the disc in the same manner as in Example 1. A coin-type lithium primary battery was produced in the same manner as in Example 1 except for the use of the negative electrode instead of the negative electrode 11. It should be noted that before the carbon layer was formed on the lithium metal surface, a coating film made of components other than a lithium carboxylate had been formed on the lithium metal surface.

Comparative Example 3

A coin-type lithium primary battery was produced in the same manner as in Example 1 except that no carbon layer was formed on the surface of the lithium carboxylate layer of the negative electrode.

Comparative Example 4

A negative electrode was produced by punching out a 1.3 mm thick lithium metal to a disc of 18.0 mm in diameter, pressing the disc to the inner face of a stainless steel negative electrode case, and forming a carbon layer on the surface of the disc in the same manner as in Example 1. A coin-type lithium primary battery was produced in the same manner as in Example 8 except for the use of the negative electrode instead of the negative electrode 11. It should be noted that before the carbon layer was formed on the lithium metal surface, a coating film made of components other than a lithium carboxylate had been formed on the lithium metal surface.

Comparative Example 5

A coin-type lithium primary battery was produced in the same manner as in Example 8 except that no carbon layer was formed on the surface of the lithium carboxylate layer of the negative electrode.

Test Example 1

Three coin-type lithium primary batteries of each of Examples 1 to 7 and Comparative Examples 1 to 3 were subjected to the following evaluation test. Table 1 shows the results. Three coin-type lithium primary batteries of each of Example 8 and Comparative Examples 4 to 5 were subjected to the following evaluation test. Table 2 shows the results. In the column "Carbonaceous powder of carbon layer" in Tables 1 and 2, AB represents acetylene black, CB represents carbon black, artificial graphite X represents high purity graphite, and artificial graphite Y represents CARBOTRON PSF.

(A) Evaluation of Initial Characteristics

Each battery immediately after the production thereof was preliminarily discharged at a constant current of 4 mA for 30 minutes. It was then subjected to aging at 60° C. for 1 day to stabilize the open circuit voltage (OCV). Thereafter, the OCV and battery internal resistance at 1 kHz were measured at room temperature. As a result, none of the batteries was found to have any defect.

(B) Evaluation of Low-Temperature, Large-Current Discharge Characteristics

After each battery was subjected to aging at 60° C. for 1 day, it was subjected to a pulse discharge in an environment of −40° C. to evaluate the low-temperature, large-current discharge characteristics. Specifically, the battery was discharged at a constant current of 10 mA for 20 seconds and then allowed to stand for 60 seconds. This discharge cycle was repeated for 720 hours (30 days), and a change in voltage over time during pulse discharge at each cycle was measured to obtain the lowest pulse voltage in 720 hours.

(C) Measurement of Thickness of Lithium Carboxylate Layer

The thickness of the lithium carboxylate layer was determined by X-ray photoelectron spectroscopy (XPS). Specifically, using an X-ray photoelectron spectrometer (trade name: Model 5600, available from ULVAC-PHI, INC.), the thickness of the lithium carboxylate layer was calculated from changes in the respective C1s, O1s, F1s, and B1s spectra relative to a change in the irradiation time of argon beam.

Also, the respective XPS C1s, O1s, F1s, and B1s spectra of the negative electrode surface of each of Example 1 and Comparative Example 1 were obtained by an X-ray photoelectron spectrometer (Model 5600). FIGS. 2A to 2D, 3A to 3D and 4A to 4D show the results.

Figure 2A:
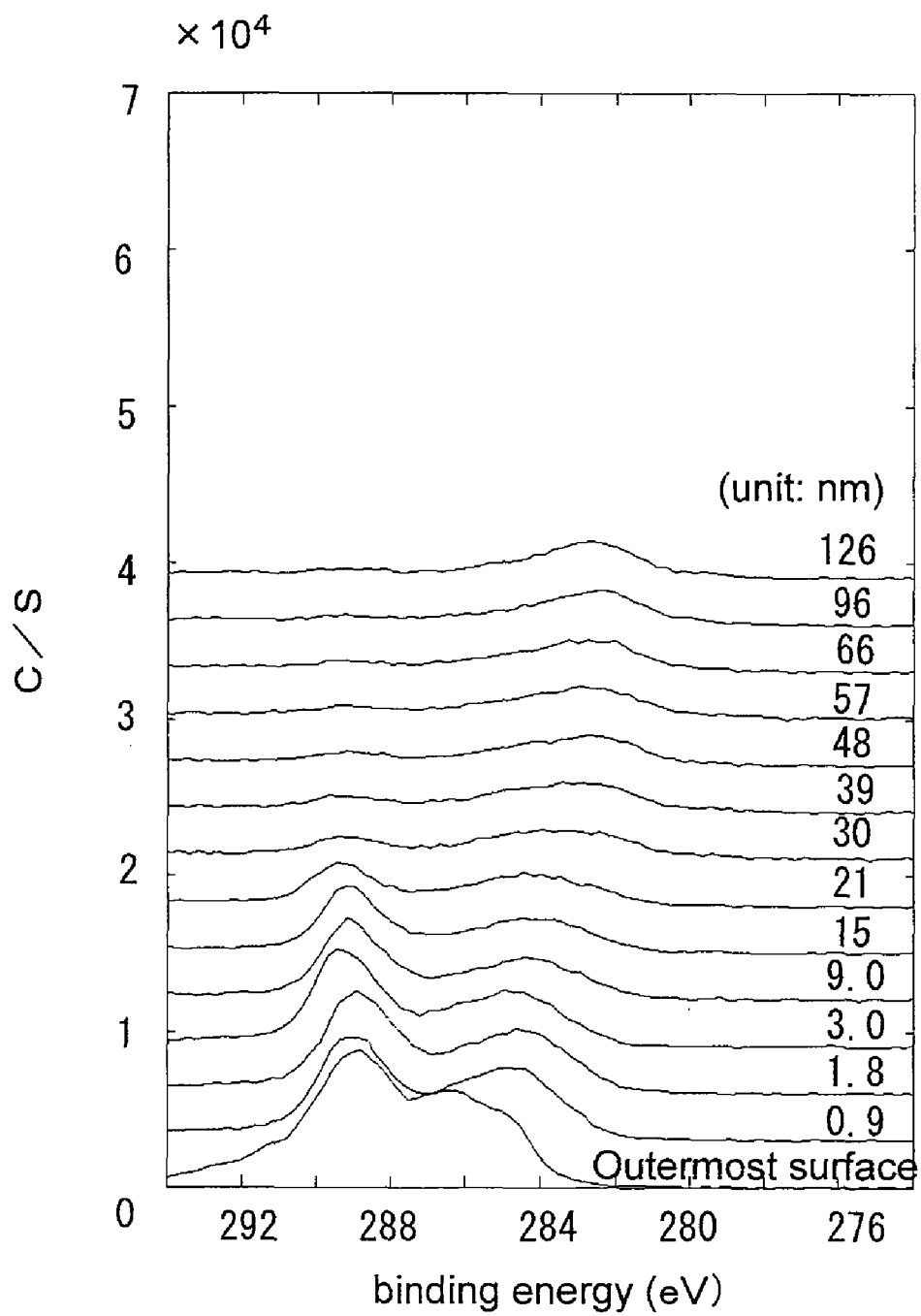
FIG. 2A is XPS C1s spectra of binding energy of the lithium surface of a negative electrode in Example 1.
Figure 2B:
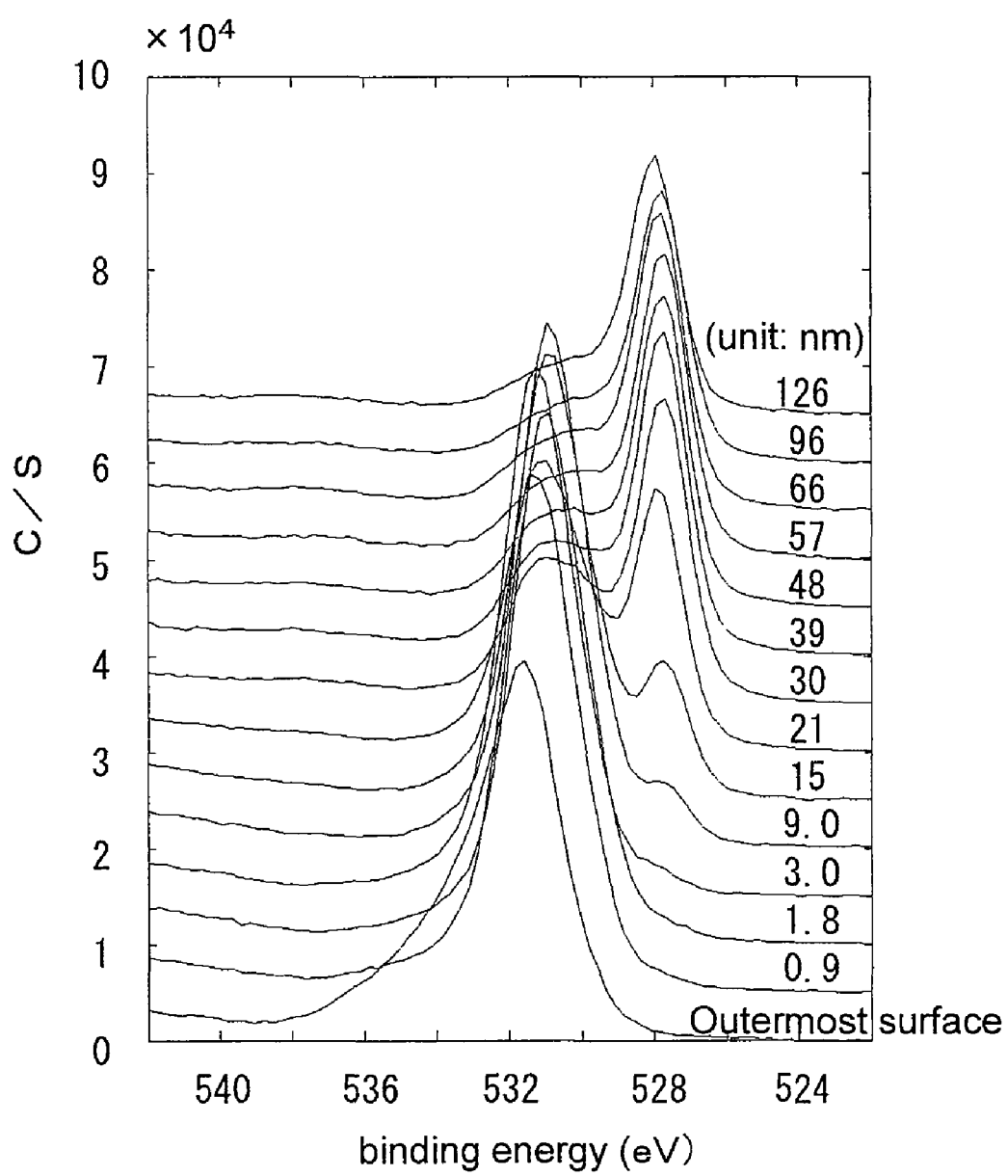
FIG. 2B is XPS O1s spectra of binding energy of the lithium surface of a negative electrode in Example 1.
Figure 2C:
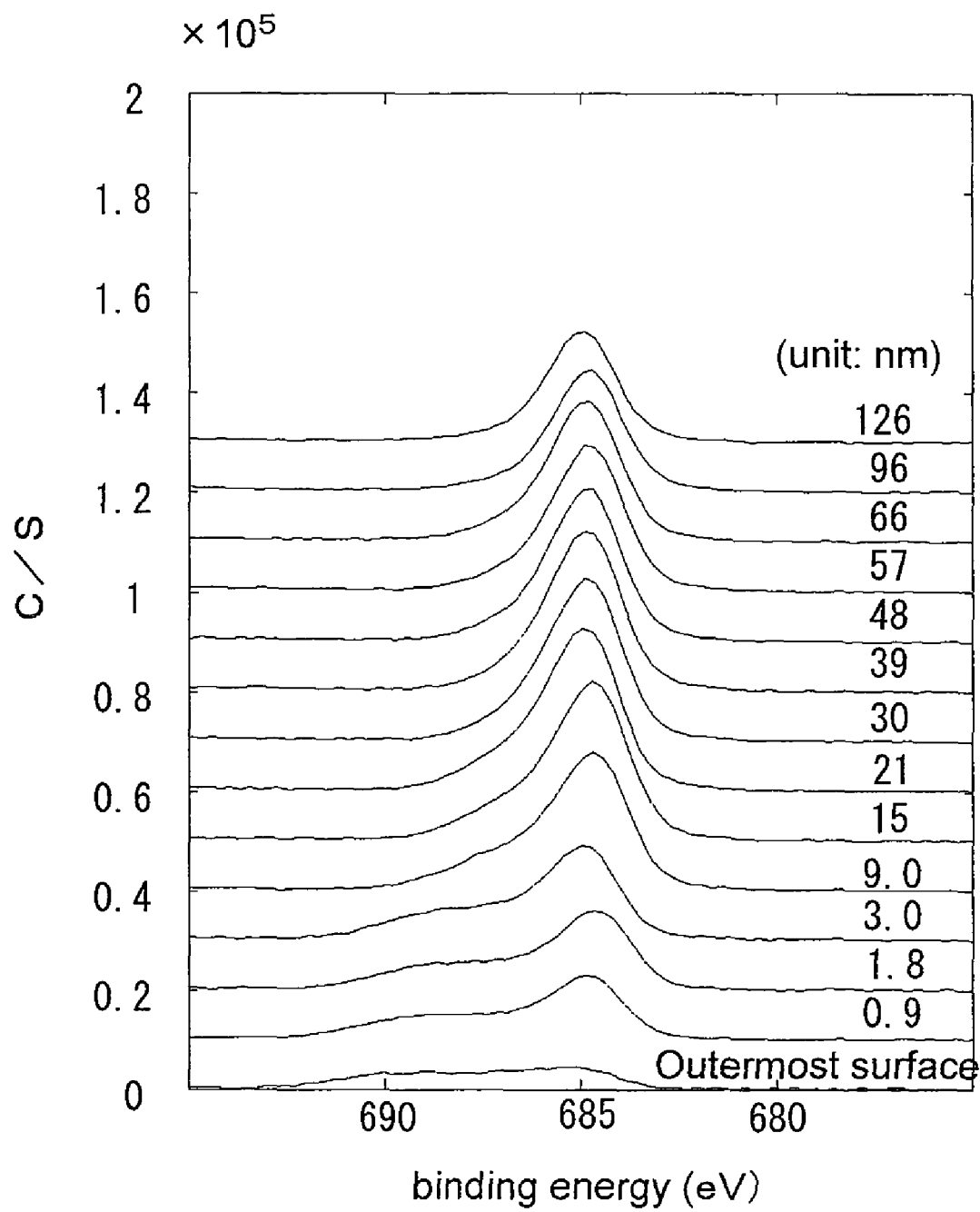
FIG. 2C is XPS F1s spectra of binding energy of the lithium surface of a negative electrode in Example 1.
Figure 2D:
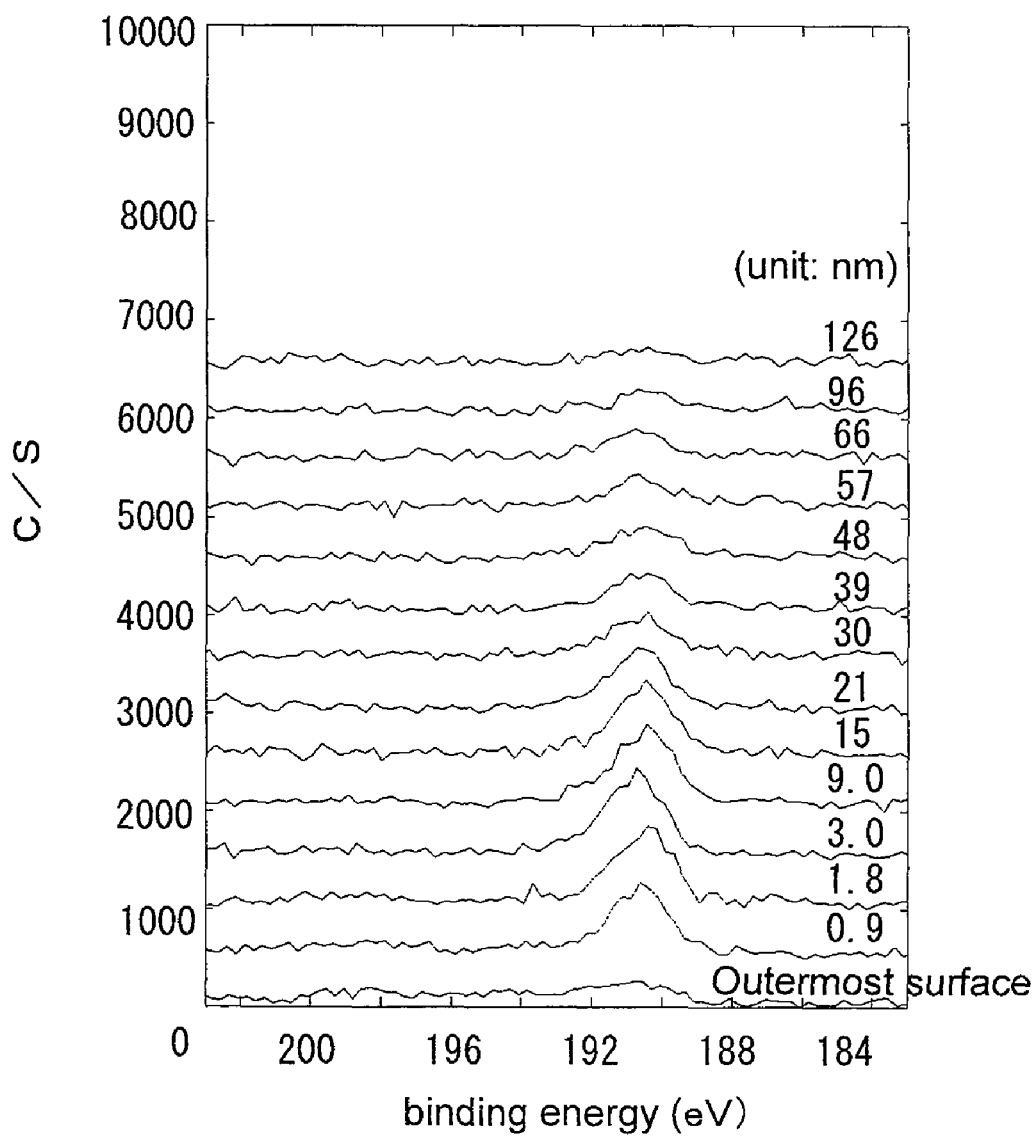
FIG. 2D is XPS B1s spectra of binding energy of the lithium surface of a negative electrode in Example 1.

FIGS. 2A to 2D show XPS spectra of the lithium surface of the negative electrode of Example 1. FIG. 2A shows C1s spectra of binding energy. FIG. 2B shows O1s spectra of binding energy. FIG. 2C shows F1s spectra of binding energy. FIG. 2D shows B1s spectra of binding energy.

Figure 3A:
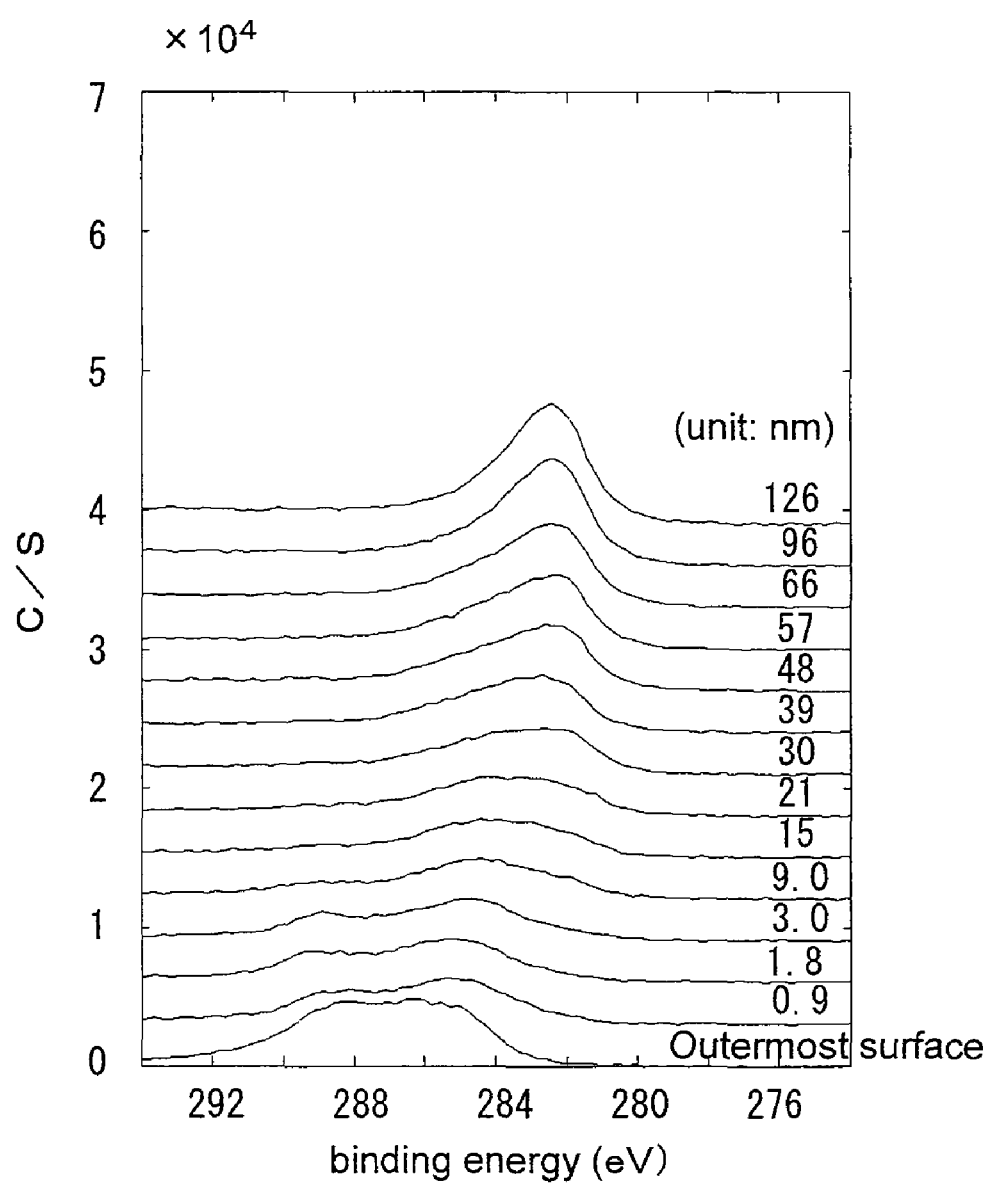
FIG. 3A is XPS C1s spectra of binding energy of the carbon layer surface of the negative electrode in Example 1.
Figure 3B:
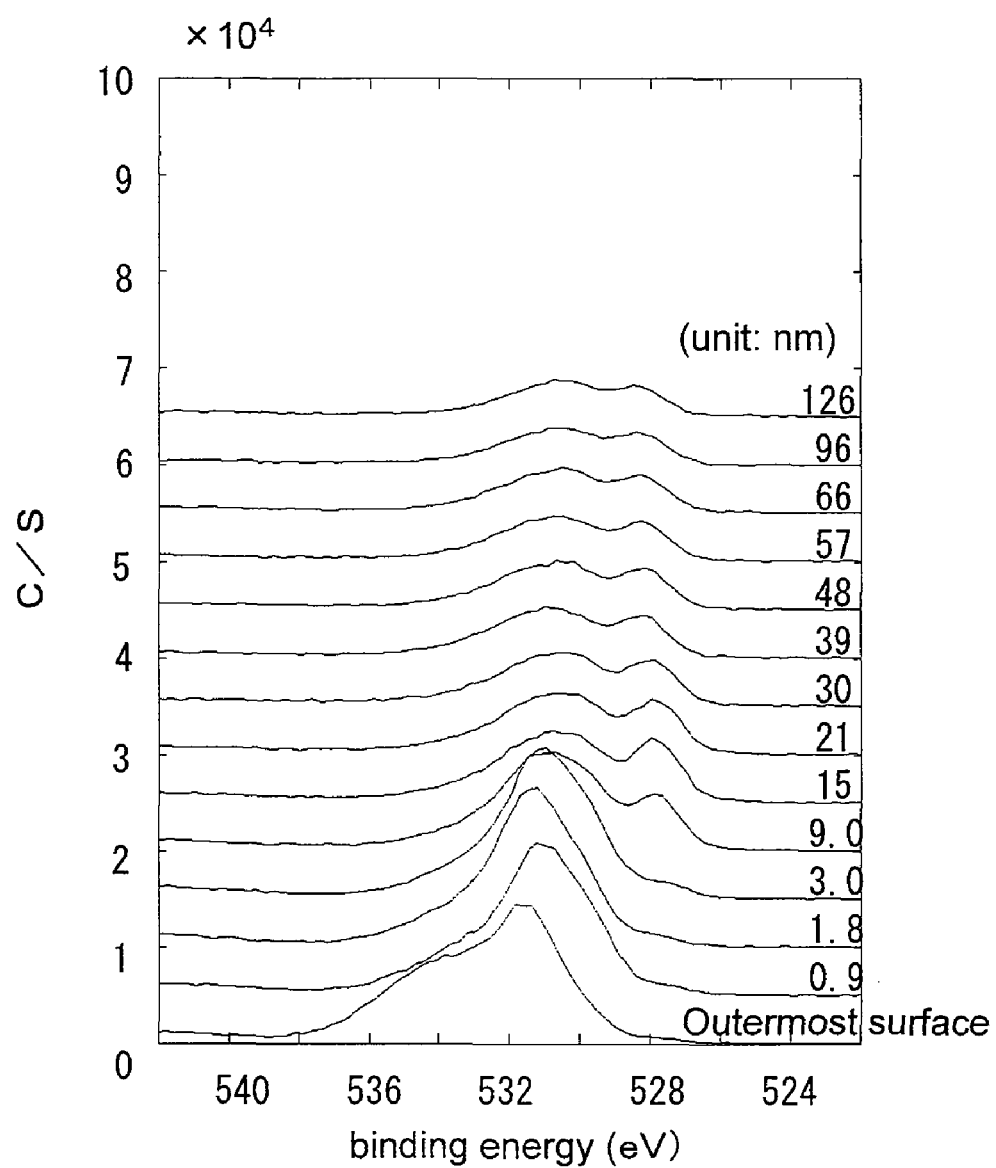
FIG. 3B is XPS O1s spectra of binding energy of the carbon layer surface of the negative electrode in Example 1.
Figure 3C:
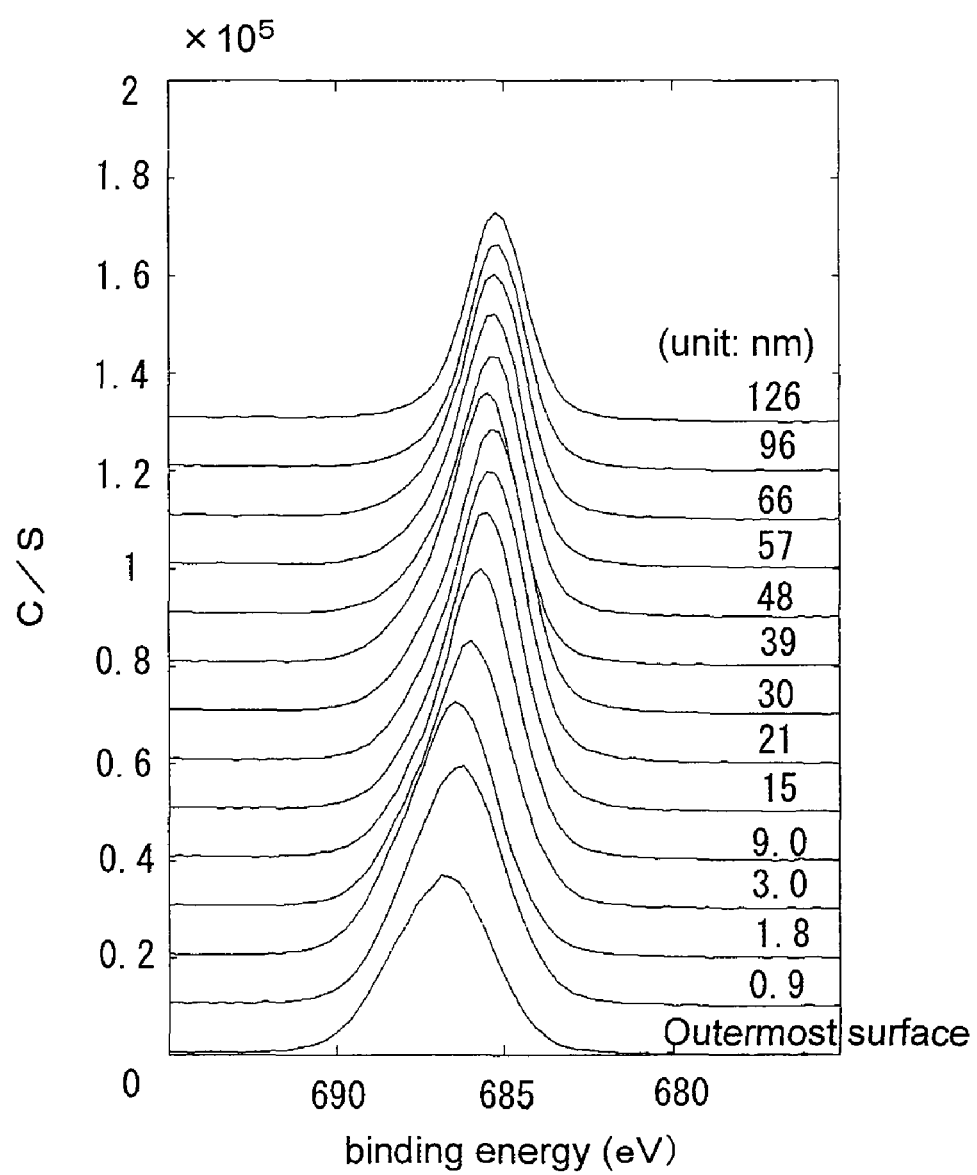
FIG. 3C is XPS F1s spectra of binding energy of the carbon layer surface of the negative electrode in Example 1.
Figure 3D:
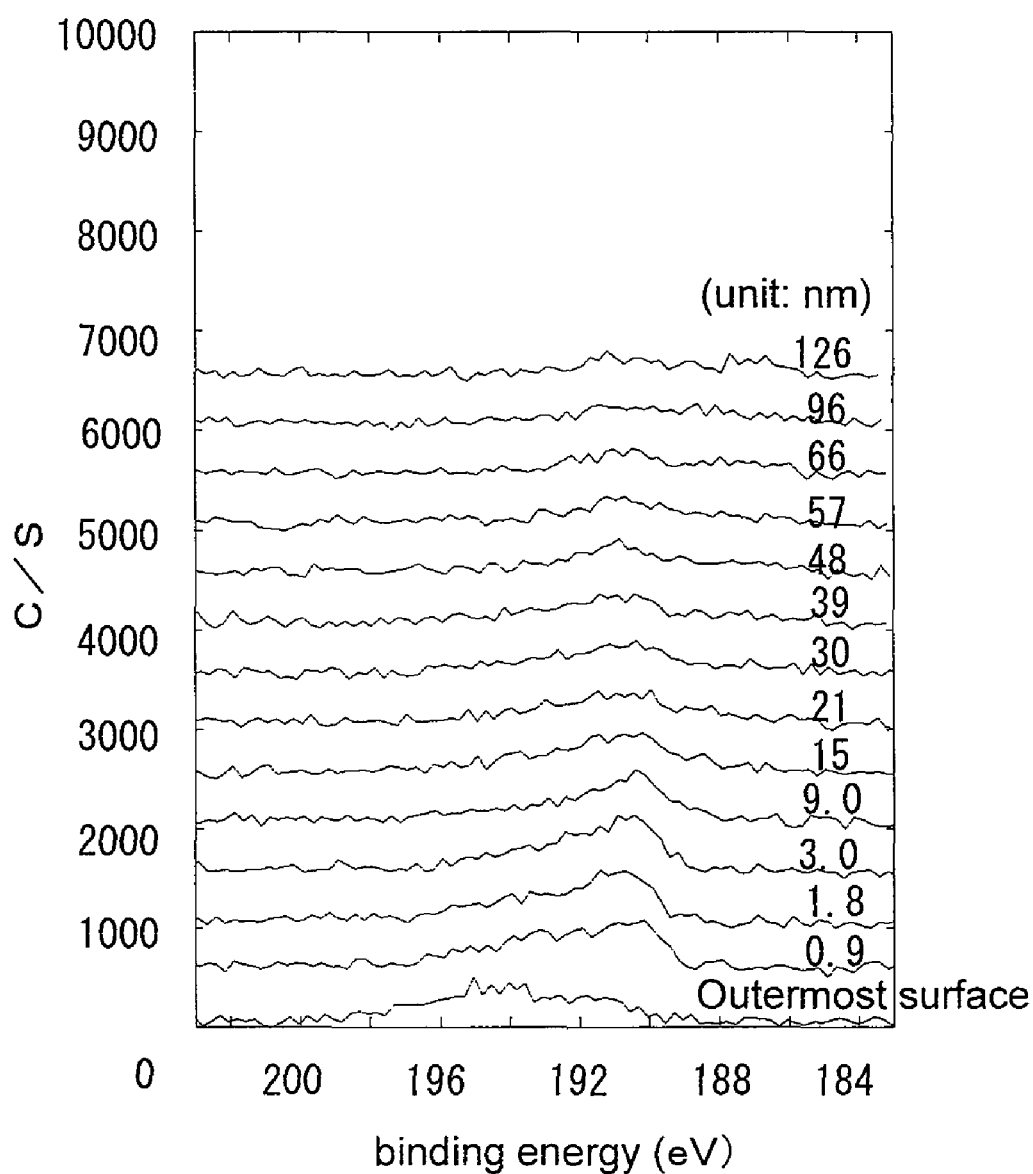
FIG. 3D is XPS B1s spectra of binding energy of the carbon layer surface of the negative electrode in Example 1.

FIGS. 3A to 3D shows XPS spectra of the carbon layer surface of the negative electrode of Example 1. FIG. 3A shows C1s spectra of binding energy. FIG. 3B shows O1s spectra of binding energy. FIG. 3C shows F1s spectra of binding energy. FIG. 3D shows B1s spectra of binding energy.

Figure 4A:
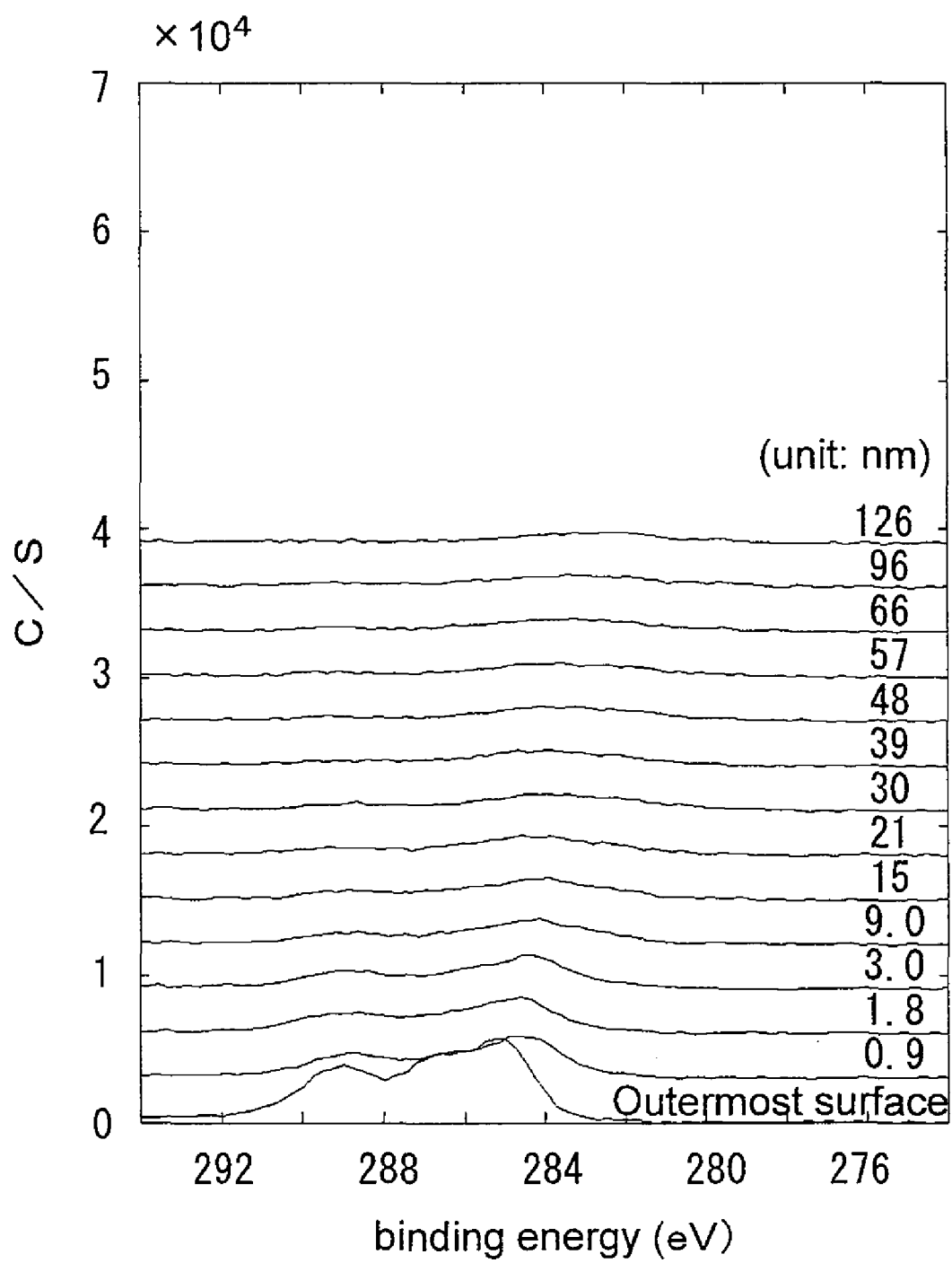
FIG. 4A is XPS C1s spectra of binding energy of the lithium surface of a negative electrode in Comparative Example 1.
Figure 4B:
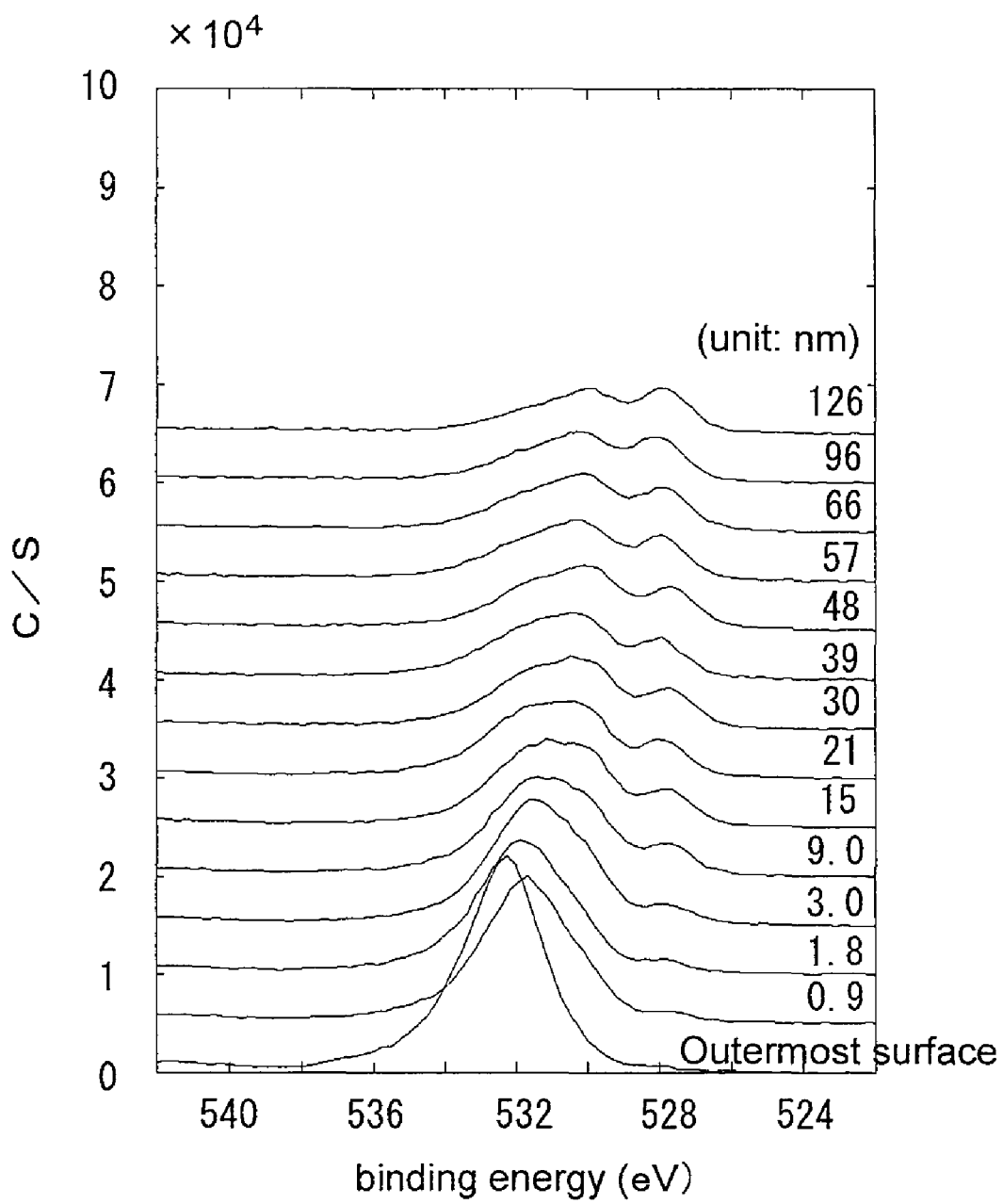
FIG. 4B is XPS O1s spectra of binding energy of the lithium surface of a negative electrode in Comparative Example 1.
Figure 4C:
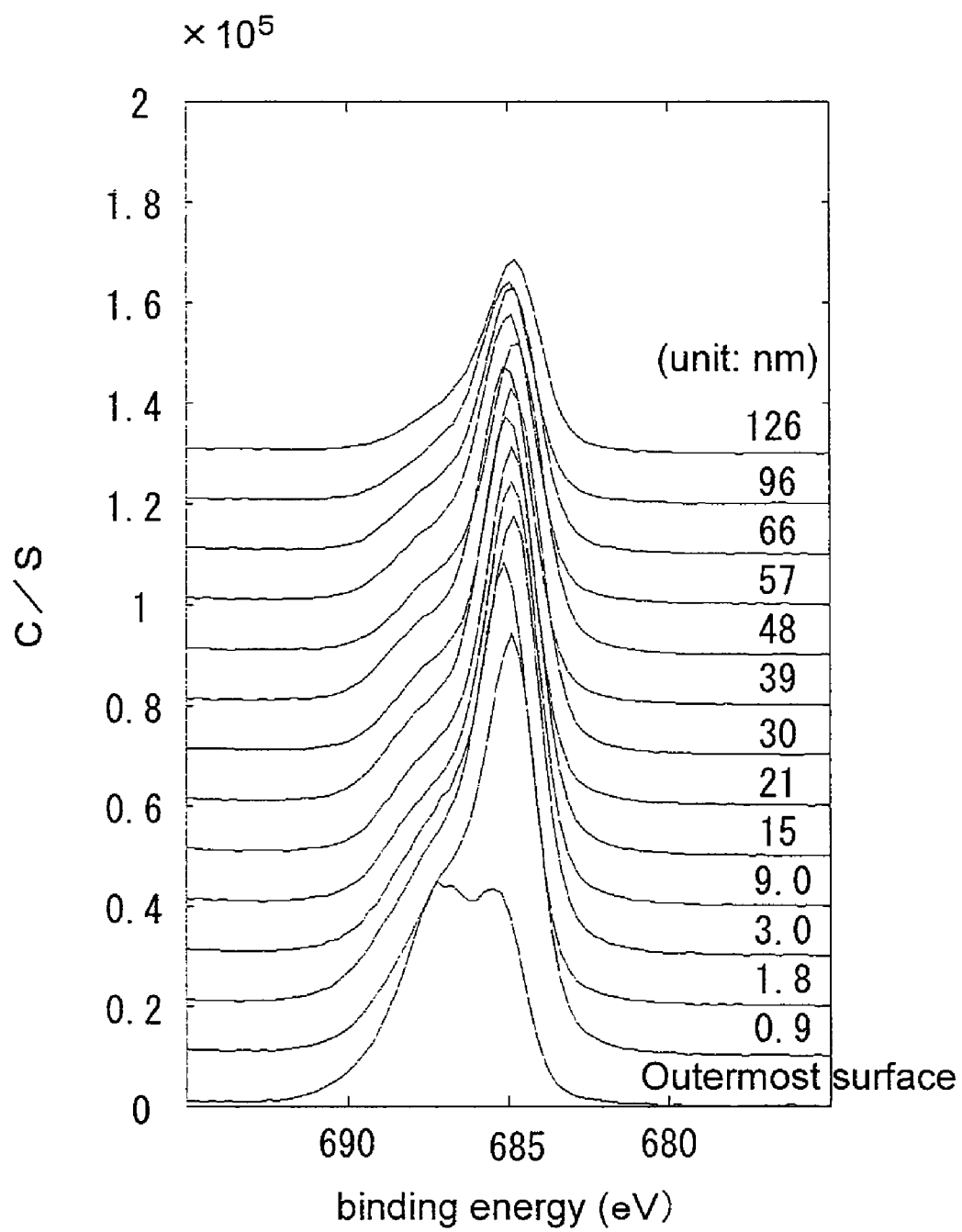
FIG. 4C is XPS F1s spectra of binding energy of the lithium surface of a negative electrode in Comparative Example 1.
Figure 4D:
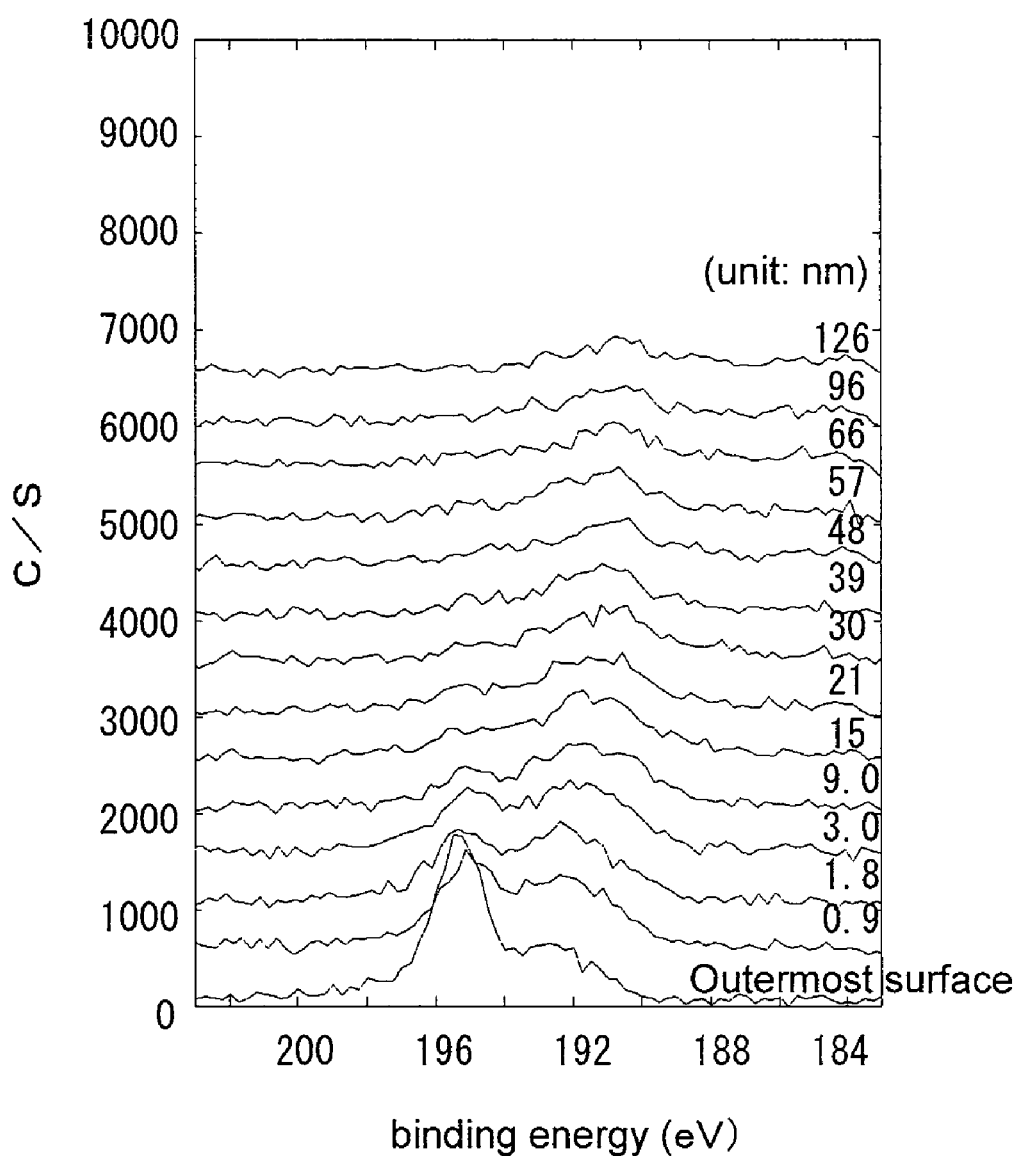
FIG. 4D is XPS B1s spectra of binding energy of the lithium surface of a negative electrode in Comparative Example 1.

FIG. 4A to 4D show XPS spectra of the lithium surface of the negative electrode of Comparative Example 1. FIG. 4A shows C1s spectra of binding energy. FIG. 4B shows O1s spectra of binding energy. FIG. 4C shows F1s spectra of binding energy. FIG. 4D shows B1s spectra of binding energy.

TABLE 1

| | | Thickness of $Li_2CO_3$ layer (mm) | Carbonaceous powder of carbon layer | Electrolyte Solute | Electrolyte Solvent | Initial OCV (V) | Initial battery internal resistance (Ω) | Pulse discharge voltage (V) |
|---|---|---|---|---|---|---|---|---|
| Example | 1 | 30 | AB | $LiBF_4$ | γ-BL | 3.35 | 6.9 | 1.99 |
| | 2 | 10 | AB | $LiBF_4$ | γ-BL | 3.35 | 7.0 | 1.96 |
| | 3 | 30 | CB | $LiBF_4$ | γ-BL | 3.34 | 6.7 | 1.97 |
| | 4 | 30 | Artificial graphite*[1] | $LiBF_4$ | γ-BL | 3.38 | 6.3 | 1.98 |
| | 5 | 30 | Artificial graphite*[2] | $LiBF_4$ | γ-BL | 3.38 | 8.4 | 1.98 |
| | 6 | 30 | AB | $LiN(CF_3SO_2)_2$ | γ-BL | 3.15 | 6.0 | 1.93 |
| | 7 | 30 | AB | $LiPF_6$ | γ-BL | 3.35 | 7.1 | 1.86 |
| Comp. Example | 1 | 5 | — | $LiBF_4$ | γ-BL | 3.42 | 8.5 | 1.70 |
| | 2 | — | AB | $LiBF_4$ | γ-BL | 3.35 | 7.5 | 1.75 |
| | 3 | 30 | — | $LiBF_4$ | γ-BL | 3.41 | 8.4 | 1.70 |

TABLE 2

|  | Thickness of Li$_2$CO$_3$ layer (mm) | Carbonaceous powder of carbon layer | Initial OCV (V) | Initial battery internal resistance (Ω) | Pulse discharge voltage (V) |
| --- | --- | --- | --- | --- | --- |
| Example 8 | 30 | AB | 3.24 | 5.2 | 2.19 |
| Comp. Example 4 | — | AB | 3.24 | 5.6 | 1.99 |
| Comp. Example 5 | 30 | — | 3.24 | 7.1 | 1.90 |

As shown in Table 1, every battery using graphite fluoride as the positive electrode active material exhibited an OCV higher than 3 V, an initial battery internal resistance at 1 kHz of less than 8.5Ω at 20° C., and hence good initial characteristics. The batteries of Examples 1 to 7 of the invention exhibited higher values of lowest closed circuit voltage on pulse discharge (pulse discharge voltage) than the batteries of Comparative Examples 1 to 3.

Also, as shown in Table 2, every battery using manganese dioxide as the positive electrode active material exhibited an OCV higher than 3 V, an initial battery internal resistance at 1 kHz of less than 8.5Ω at 20° C., and hence good initial characteristics. The battery of Example 8 of the invention exhibited a higher value of lowest closed circuit voltage on pulse discharge (pulse discharge voltage) than the battery of Comparative Examples 4 to 5.

Also, as shown in FIGS. 2A to 2D, the lithium surface of Example 1 exhibited C1s peaks at 290 to 289 eV (FIG. 2A) and O1s peaks at 533 to 530 eV (FIG. 2B), which are derived from a lithium carboxylate, up to a depth of 30 μm. It also exhibited F1s peak at 686 eV (FIG. 2C), which is derived from LiF, but this peak was very small. Also, there were no B1s peaks at 195 eV (FIG. 2D), which are derived from the B—F bond (presumably derived from the decomposition of the solute of the non-aqueous electrolyte).

Also, as shown in FIGS. 3A to 3D, the carbon layer surface of Example 1 exhibited slight C1s peaks at 290 to 289 eV (FIG. 3A) and O1s peaks at 533 to 530 eV (FIG. 3B), which are derived from a lithium carboxylate, near the outermost surface layer. It also exhibited F1s peak at 686 eV (FIG. 3C), which are derived from LiF. There were almost no B1s peaks at 195 eV (FIG. 3D), which are derived from the B—F bond.

From these, it is assumed that in Example 1, a lithium carboxylate layer and a carbon layer are formed on the lithium surface, and that the carbon layer formed on the lithium carboxylate layer suppresses the reaction between the lithium and the non-aqueous electrolyte, specifically, the formation of LiF due to the reaction between the lithium and the solute. It is also assumed that LiF formed on the negative electrode surface is formed on the carbon layer surface, not on the lithium surface.

In contrast, as shown in FIGS. 4A to 4D, the lithium surface of Comparative Example 1 exhibited slight C1s peaks at 290 to 289 eV (FIG. 4A) and O1s peaks at 533 to 530 eV (FIG. 4B), which are derived from a lithium carboxylate, near the outermost surface. It also exhibited F1s peak at 686 eV (FIG. 4C), which are derived from LiF, and B1s peaks at 195 eV (FIG. 4D), which are derived from the B—F bond.

From these, it is assumed that electrically insulating LiF is formed on the lithium surface of Comparative Example 1, and that the solute in the non-aqueous electrolyte is decomposed.

In the batteries of Examples 1 to 7, the lithium carboxylate layer is thought to suppress the formation of an oxide coating film made of lithium oxide or lithium hydroxide. Also, the carbon layer is thought to protect the lithium carboxylate layer, thereby suppressing the reaction between lithium carbonate and fluorine in the electrolyte derived from the positive electrode or solute, and suppressing the formation of LiF, which is a product of the reaction between the negative electrode lithium and the solute in the non-aqueous electrolyte. Also, LiF formed on the negative electrode surface is formed on the carbon layer surface, not on the lithium surface. Probably for this reason, an increase in the polarization of the lithium surface during discharge is suppressed and good pulse characteristics at −40° C. can be obtained.

In the battery of Example 8, the lithium carboxylate layer is thought to suppress the formation of an oxide coating film made of lithium oxide or lithium hydroxide, in the same manner as in Examples 1 to 7. Also, the carbon layer is thought to protect the lithium carboxylate layer, thereby suppressing the reaction between the lithium of the negative electrode and the non-aqueous electrolyte.

Contrary to this, in Comparative Example 1, the lithium carboxylate layer is thin. The thin lithium carboxylate layer is thought to be unable to sufficiently suppress the formation of an oxide coating film made of lithium oxide or lithium hydroxide. Also, since a carbon layer is not formed, the lithium carboxylate layer reacts with fluorine in the non-aqueous electrolyte derived from the positive electrode or solute to form LiF. Further, the formation of products of the reaction between lithium and fluorine in the non-aqueous electrolyte derived from the positive electrode or solute, for example, LiF, on the lithium surface is thought to increase the polarization of the lithium surface, thereby resulting in poor pulse characteristics.

In Comparative Examples 2 and 4, a coating film containing large amounts of components other than lithium butyrate and lithium carbonate is formed on the lithium metal surface of the negative electrode. Such coating film is thought to increase the polarization of the lithium surface, thereby resulting in poor pulse characteristics. In Comparative Example 3, since a carbon layer is not formed, the lithium carboxylate layer reacts with fluorine in the non-aqueous electrolyte derived from the positive electrode or solute to form LiF. Further, the formation of products of the reaction between lithium and fluorine in the non-aqueous electrolyte derived from the positive electrode or solute, for example, LiF, on the lithium surface is thought to increase the polarization of the lithium surface, thereby resulting in poor pulse characteristics. In Comparative Example 5, since the carbon layer is not formed, the lithium carboxylate layer reacts with components in the non-aqueous electrolyte, and the deposition of the reaction products on the negative electrode surface is thought to increase negative electrode polarization, thereby resulting in poor pulse characteristics.

Test Example 2

The high-temperature storage characteristics of the batteries were examined. Specifically, three lithium primary batteries of each of Example 1 and Comparative Example 1 were subjected to aging at 60° C. for 1 day. They were then stored in high-temperature environments of 85° C. and 125° C. and measured for battery thickness. Table 3 shows the results.

TABLE 3

| Storage temperature (° C.) | Storage period | Battery thickness (mm) | |
|---|---|---|---|
| | | Example 1 | Comparative Example 1 |
| 85 | Before storage | 4.96 | 4.94 |
| | After 2 days | 4.97 | 4.93 |
| | After 5 days | 4.98 | 4.95 |
| | After 15 days | 4.98 | 4.96 |
| 125 | Before storage | 4.90 | 4.89 |
| | After 1 day | 4.92 | 4.95 |
| | After 5 days | 4.95 | 5.03 |
| | After 10 days | 4.95 | 5.02 |

Test Example 3

The high-temperature storage characteristics of the batteries were examined. Specifically, three lithium primary batteries of each of Example 1 and Comparative Example 1 were subjected to aging at 60° C. for 1 day. They were then stored in high-temperature environments of 85° C. and 125° C. and measured for open circuit voltage (OCV) and battery internal resistance at 1 kHz after storage, at 20° C. Table 4 shows the results.

TABLE 4

| | Storage condition | OCV (V) | Battery internal resistance (Ω) |
|---|---|---|---|
| Example 1 | Before storage | 3.35 | 6.9 |
| | After 15-day storage at 85° C. | 3.39 | 13.0 |
| | After 10-day storage at 125° C. | 3.44 | 14.4 |
| Comparative Example 1 | Before storage | 3.42 | 8.5 |
| | After 15-day storage at 85° C. | 3.44 | 16.5 |
| | After 10-day storage at 125° C. | 3.43 | 116.0 |

As shown in Table 3, there was almost no difference in battery swelling after the high temperature storage at 85° C. between the batteries of Example 1 and Comparative Example 1, whereas the battery of Comparative Example 1 exhibited clearly larger swelling after the 15-day storage at 125° C.

Also, as shown in Table 3 and Table 4, the battery of Example 1 exhibited good storage characteristics even at high temperatures of 85° C. or more. In Example 1, even in the high temperature storage, the initial performance was stably maintained. Contrary to this, in Comparative Example 1, the battery internal resistance increased significantly after the 10-day storage at 125° C. In Comparative Example 1, the reaction of the negative electrode surface was promoted by the high temperature storage, and the formation of LiF at the negative electrode surface was thus promoted. This is probably the reason for the increased internal resistance.

As in the battery of Example 1, the use of a non-aqueous electrolyte containing lithium tetrafluoroborate as the solute and γ-butyrolactone as the solvent provides not only particularly good low-temperature, large-current discharge characteristics but also particularly good high-temperature storage characteristics. In the Examples, lithium metal was used as the negative electrode active material, but the use of a lithium alloy can also produce essentially the same effects.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

The invention claimed is:

1. A negative electrode for a lithium primary battery, the negative electrode comprising:
   lithium or a lithium alloy;
   a lithium carboxylate layer formed on a surface of the lithium or lithium alloy; and
   a carbon layer formed on a surface of the lithium carboxylate layer,
   wherein the lithium carboxylate layer comprises lithium carbonate and organic lithium carboxylate including lithium butyrate, and has a thickness of 10 to 30 nm.

2. A lithium primary battery comprising:
   a positive electrode containing graphite fluoride or manganese dioxide;
   the negative electrode for a lithium primary battery of claim 1; and
   a non-aqueous electrolyte.

3. The lithium primary battery in accordance with claim 2, wherein the non-aqueous electrolyte contains lithium tetrafluoroborate as a solute and γ-butyrolactone as a non-aqueous solvent.

* * * * *